(12) United States Patent
Konya

(10) Patent No.: US 8,422,947 B2
(45) Date of Patent: *Apr. 16, 2013

(54) COMMUNICATION DEVICE, HIGH-FREQUENCY COUPLER, COUPLER ELECTRODE, AND COMPOSITE COMMUNICATION APPARATUS

(76) Inventor: Satoshi Konya, Kanagawa (JP)

( * ) Notice: Subject to any disclaimer, the term of this patent is extended or adjusted under 35 U.S.C. 154(b) by 536 days.

This patent is subject to a terminal disclaimer.

(21) Appl. No.: 12/716,800

(22) Filed: Mar. 3, 2010

(65) Prior Publication Data

US 2011/0136430 A1    Jun. 9, 2011

(30) Foreign Application Priority Data

Mar. 12, 2009    (JP) .................. P2009-059652

(51) Int. Cl.
*H04B 7/00*    (2006.01)

(52) U.S. Cl.
USPC .......... 455/41.1; 455/426; 455/422; 455/282; 455/41.2; 455/562.1; 455/575.7; 455/97; 455/279.1; 455/274; 455/270; 370/338; 370/252; 370/463; 370/351; 375/82; 375/237; 375/238; 375/239; 375/354; 375/355; 375/374; 375/340; 343/714; 343/715; 343/723; 343/750; 343/717; 333/109; 333/111; 333/125; 333/134; 333/136

(58) Field of Classification Search ........................ None
See application file for complete search history.

(56) References Cited

U.S. PATENT DOCUMENTS

| | | | | |
|---|---|---|---|---|
| 2,921,277 | A * | 1/1960 | Goubau ................... | 333/240 |
| 6,535,743 | B1 * | 3/2003 | Kennedy et al. ........... | 455/456.1 |
| 6,594,483 | B2 * | 7/2003 | Nykanen et al. ............ | 455/411 |
| 6,681,107 | B2 * | 1/2004 | Jenkins et al. ............. | 455/412.1 |
| 6,987,490 | B2 * | 1/2006 | Sano ...................... | 343/788 |
| 7,027,773 | B1 * | 4/2006 | McMillin ................. | 455/41.2 |
| 2004/0077313 | A1 | 4/2004 | Oba et al. | |
| 2004/0223477 | A1 * | 11/2004 | Iwasaki et al. ............ | 370/338 |
| 2006/0164300 | A1 * | 7/2006 | Ellard .................... | 342/374 |
| 2010/0019871 | A1 * | 1/2010 | Washiro ................... | 333/246 |

FOREIGN PATENT DOCUMENTS

JP    2003-087263    3/2003

OTHER PUBLICATIONS

Noncontact IC Card Reader/Writer; http://www.sony.co.jp/Products/felica/pdt/rdw4.html, pp. 1-3.

* cited by examiner

*Primary Examiner* — Zhiyu Lu
*Assistant Examiner* — Ganiyu A Hanidu
(74) *Attorney, Agent, or Firm* — Sony Corporation

(57) ABSTRACT

A communication device includes a communication circuit part, a transmission path for signals, a ground, a coupler electrode, and a resonance part. The coupler electrode includes an upper flat part as an electrode, a support, and a connecting portion. The support supports the upper flat part. Thus, the upper flat part faces the ground and is separately placed therefrom at a height only enough to ignore the wavelength of the signal, while having a flexible portion which is elastically deformable in the height direction. On the connecting portion, the other end of the support is connected to the transmission path. The resonance part enlarges a current flowing into the coupler electrode through the transmission path. A micro dipole is a line segment connecting between the center of accumulated electric charge in the coupler electrode and the center of mirror charge accumulated in the ground.

11 Claims, 11 Drawing Sheets

FIG. 11A
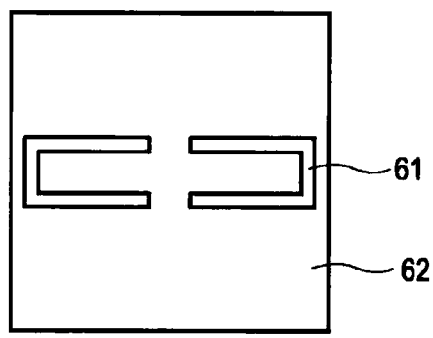
FIG. 11B
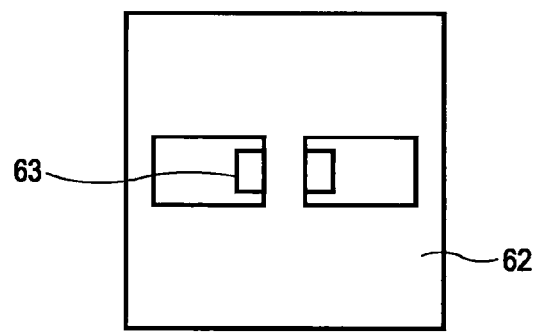
FIG. 11C     FIG. 11D     FIG. 11E
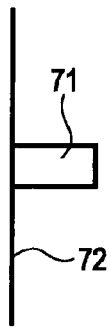 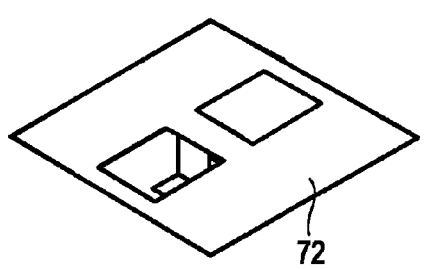 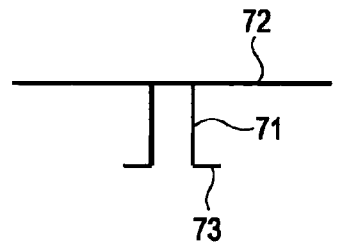

COMMUNICATION DEVICE, HIGH-FREQUENCY COUPLER, COUPLER ELECTRODE, AND COMPOSITE COMMUNICATION APPARATUS

BACKGROUND OF THE INVENTION

1. Field of the Invention

The present invention relates to a communication device that performs a large-capacity data transmission at short range by a weak ultra wideband (UWB) communication mode using a high-frequency broadband, a high-frequency coupler, a coupler electrode, and a composite communication apparatus with a combination of electromagnetic induction type contactless communication and weak UWB communication. In particular, the present invention relates to a communication device that performs large-capacity data transmission and authentication or payment transaction operation associated with data communication by single user's operation so that the user will feel the same sense of access time as that of the typical authentication/payment transaction operation, a high-frequency coupler, a coupler electrode, and a composite communication apparatus.

2. Description of the Related Art

Contactless communications have been widely distributed as media for authentication information, electronic money, and other value information. The contactless communication system is composed of an integrated circuit (IC) chip as a transponder and a device that reads information from the IC chip or writes information to the IC chip (hereinafter referred to as a "reader/writer"). The contactless communication system provides great convenience because the IC chip and the reader/writer therein exchange the information therebetween in a contactless manner. In addition, the IC chip system has been used in the form of a card or incorporated in a personal terminal, such as a cellular phone.

Short-range type IC card standards based on ISO/IEC 14443 include Type A, Type B, and FeliCa (registered trademark). A near field communication (NFC) standard developed by Sony and Philips is an RFID standard that defines the specifications of a NFC device (reader/writer) capable of mainly communicating with each of Type A, Type B, and Felica IC cards. The NFC standard uses the 13.56-MHz band and allows electromagnetic-induction type bidirectional communication with a very short communication range of approximately 0 to 10 cm ("Proximity").

Recently, a compact size reader/writer module suitable for built-in application has been developed and manufactured. Such a module can be mounted on any of various instruments including Point-Of-Sales (POS) terminals, automatic vending machines, and personal computers (see, for example, http://www.sony.co.jp/Products/felica/pdt/rdw4.html). FIG. 1 is a top view of a modularized reader/writer. As shown in the figure, the reader/writer 101 includes a reader/writer in near field communication (NFC) circuit 102 and an antenna coil 103. FIG. 2 is a cross-sectional view of an apparatus, such a personal computer in which the reader/writer module 101 is housed. In this figure, the structural components of the apparatus are only represented by "internal components" 109 and a "housing" 108 for illustrating in a simple manner. In these figures, the reader/writer module 101 is supported on a metal plate 104 with a ferrite layer 105 through a spacer 106. A communication system based on the NFC standard is a short-range communication with a communication range of approximately 0 to 10 cm, so that the reader/writer module 101 is usually arranged near the surface of the housing 108.

It has become popular to carry out personal identification, electronic money payment, or the like by placing a portable terminal or personal digital assistant (PDA) with an IC card or an IC chip over the reading surface of the reader/writer module in an automatic vending machine, a personal computer, or the like. For instance, there is proposed a note-book type information processing apparatus in which a reader/writer module is incorporated in the palm rest portion of the main body's keyboard to read out information from an adjacent contactless IC tag (see, for example, Japanese Patent Laid-Open No. 2003-87263).

The contactless communication system can be further applied to high-capacity data transmission, such as download or streaming of video, music, or the like. For instance, any fee-based contents can be downloaded from an automatic vending machine into a portable terminal. Alternatively, contents may be downloaded from a fee-based website into the portable terminal through a personal computer connecting to the internet. In this case, the high-capacity data transmission as well as the authentication/payment transaction using the IC chip in the portable terminal can be performed by only a single user's operation of placing the portable terminal over the reading surface of the reader/writer. In addition, an increase in transmission rate is indispensable because of preferably completing the authentication/payment transaction while allowing the user to feel the same sense of access time as that of the typical authentication/payment transaction operation. Moreover, the NFC is an already established technology with respect to authentication/payment transaction operation or the like. Thus, it is preferable to realize high-speed communication while having upper compatibility even at the time of high-capacity data transmission.

The NFC has a transmission rate of approximately 106 to 424 kbps and a sufficient ability to perform authentication or payment transaction, but it is very slow compared with other general-purpose wireless communications (e.g., Wi-Fi and Bluetooth). Therefore, the contactless communication system, such as the NFC system, is hardly applied to high-capacity data communication for transmission of images, sounds, and so on. In addition, the realizable maximum transmission rate of the contactless communication system, such as the NFC system, is up to 848 kbps because of physical restrictions, such as carrier frequency. Thus, a significant increase in transmission rate is not expected.

SUMMARY OF THE INVENTION

Therefore, it is desirable to provide an outstanding communication device which can perform high-capacity data transmission at short range.

It is also desirable to provide an outstanding communication device that performs large-capacity data transmission and authentication or payment transaction operation associated with data communication by single user's operation so that the user will feel the same sense of access time as that of the typical authentication/payment transaction operation.

The present invention has been made in consideration of the aforementioned circumstances. A first embodiment of the present invention is a communication device that includes: a communication circuit part that performs processing of a high-frequency signal for data transmission; a transmission path of the high-frequency signal; a ground; a coupler electrode; and a resonance part. In this device, the coupler electrode includes an upper flat part that acts as an electrode, a support that supports the upper flat part so that the upper flat part faces the ground and is separately placed from the ground at a height only enough to ignore the wavelength of the high-frequency signal, while having a flexible portion which is elastically deformable in the direction of the height, and a connecting portion where the other end of the support is connected to the transmission path. In addition, the resonance part is provided for enlarging a current flowing into the coupler electrode through the transmission path. In such a communication device, furthermore, a micro dipole is formed of a line segment that connects the center of an electric charge accumulated in the upper flat part of the coupler electrode and the center of a mirror charge accumulated in the ground is formed. In addition, the high-frequency signal is transmitted to a communication partner oppositely arranged at an angle θ of substantially zero with respect to the direction of the mirco dipole.

Specifically, the "high frequency signal" used herein may be an ultra wide band (UWB) using an ultra wideband.

In the communication device, the resonance part may be a series inductor connected between the coupler electrode and the transmission path and a parallel inductor connected between the transmission path and the ground, and the support serves as the series inductor.

According to an embodiment of the present invention, the coupler electrode of the communication device may be manufactured by the steps of: subjecting a plate metal to punching processing to form the upper flat part and a leg part to be provided as the support; subjecting the leg part to bending processing to bend the leg part substantially perpendicular to the leg part and bend a lower end portion of the leg part to form a flattened portion; and curving or bending the leg part to form a flexible portion which is elastically deformable in the direction of the height.

Furthermore, another embodiment of the present invention is a high frequency coupler that includes: a transmission path of the high-frequency signal; a ground; a coupler electrode; and a resonance part. In this high frequency coupler, the coupler electrode includes an upper flat part that acts as an electrode, a support that supports the upper flat part so that the upper flat part faces the ground and is separately placed from the ground at a height only enough to ignore the wavelength of the high-frequency signal, while having a flexible portion which is elastically deformable in the direction of the height, and a connecting portion where the other end of the support is connected to the transmission path. In addition, the resonance part is provided for enlarging a current flowing into the coupler electrode through the transmission path. In the aforementioned high-frequency coupler, a micro dipole formed of a line segment that connects the center of an electric charge accumulated in the upper flat part of the coupler electrode and the center of a mirror charge accumulated in the ground is formed, and the high-frequency signal is transmitted to a high-frequency coupler of a communication partner oppositely arranged at an angle θ of substantially zero with respect to the direction of the mirco dipole.

In addition, another embodiment of the present invention is a coupler electrode used in a high-frequency coupler that performs transmission of a high-frequency signal using an electric field coupling action. The coupler electrode includes: an upper flat part that acts as an electrode; a support that supports the upper flat part so that the upper flat part faces the ground and is separately placed from the ground at a height only enough to ignore the wavelength of the high-frequency signal, while having a flexible portion which is elastically deformable in the direction of the height; and a coupler electrode including a connecting portion where the other end of the support is connected to the transmission path. Such a coupler electrode is manufactured by the steps of: subjecting a plate metal to punching processing to form the upper flat part and a leg part to be provided as the support; subjecting the leg part to bending processing to bend the leg part substantially perpendicular to the leg part and bend a lower end portion of the leg part to form a flattened portion; and curving or bending the leg part to form a flexible portion which is elastically deformable in the direction of the height.

Another embodiment of the present invention is a composite communication apparatus that includes: a first wireless processing section that performs a contactless communication by an electromagnetic induction action using an antenna coil; and a second wireless processing section that performs a contactless communication by an electric field coupling action using a coupler electrode arranged near the antenna coil. Such a second wireless processing section includes: a communication circuit part that performs processing of a high-frequency signal for data transmission; a transmission path of the high-frequency signal; a ground; a coupler electrode; and a resonance part. In the second wireless processing section, the coupler electrode includes an upper flat part that acts as an electrode, a support that supports the upper flat part so that the upper flat part faces the ground and is separately placed from the ground at a height only enough to ignore the wavelength of the high-frequency signal, while having a flexible portion which is elastically deformable in the direction of the height, and a connecting portion where the other end of the support is connected to the transmission path. In addition, the resonance part is provided for enlarging a current flowing into the coupler electrode through the transmission path. In the aforementioned high-frequency coupler, a micro dipole formed of a line segment that connects the center of an electric charge accumulated in the upper flat part of the coupler electrode and the center of a mirror charge accumulated in the ground is formed, and the high-frequency signal is transmitted to a communication partner oppositely arranged at an angle θ of substantially zero with respect to the direction of the mirco dipole.

In the aforementioned complex communication apparatus, the coupler electrode used in the second wireless processing section may be manufactured by the steps of: subjecting a plate metal to punching processing to form the upper flat part and a leg part to be provided as the support; subjecting the leg part to bending processing to bend the length part substantially perpendicular to the leg part and bend a lower end portion of the leg part to form a flattened portion; and curving or bending the leg part to form a flexible portion which is elastically deformable in the direction of the height.

In the complex communication apparatus, furthermore, the coupler electrode of the second wireless processing section may be arranged in the inside of the antenna coil of the first wireless processing section.

In the complex communication apparatus, furthermore, the coupler electrode of the second wireless processing section may be arranged in an opening formed in the inside of the antenna coil of the first wireless processing section.

According to any of the embodiments of the present invention, a high-capacity data transmission can be performed at short range in weak UWB communication mode with a high-frequency broadband. Therefore, a communication device, a high-frequency coupler, a coupler electrode, and a composite communication apparatus with a combination of electromagnetic induction type contactless communication and weak UWB communication can be provided.

According to any of the embodiments of the present invention, furthermore, it is possible to complete a large-capacity data transmission and authentication or payment transaction operation associated with data communication by single user's operation so that the user will feel the same sense of access time as that of the typical authentication/payment transaction operation. Therefore, an outstanding communication device, high-frequency coupler, coupler electrode, and composite communication apparatus can be provided.

According to any of the embodiments of the present invention, the resonance parts enlarges a current flowing into the coupler electrode through the transmission path to enlarge the moment of the micro dipole formed by the electric charges accumulated in the coupler electrode and the mirror charges accumulated in the ground. Therefore, the high-frequency signals including the longitudinal wave $E_R$ of the electric field can be efficiently discharged in the propagation direction which is at an angle θ of substantially zero with the direction of the micro dipole. In the coupler electrode, the upper flat part which can act as an electrode is supported by the support having the flexible portion which is elastically deformable in the height direction. Thus, it can resist the external force applied in the height direction.

According to some embodiments of the present invention, a coupler electrode which can resist the external force applied in the height direction can be manufactured using plate processing with the minimum additional cost.

According to the above embodiment, the complex communication apparatus includes the first wireless processing section mainly used for authentication and payment transaction in NFC mode and the second wireless processing section that carries a data communication almost at the same short range as that of the first wireless processing section. Such a second wireless processing section allows an increase in communication rate in the entire apparatus by carrying out a high speed communication using the second wireless processing section. Furthermore, the first wireless processing section is compatible with the typical wireless communication based on the common NFC standards, substantially. Therefore, the apparatus is able to perform the typical wireless communication based on the NFC when it does not perform communication using the second wireless processing section. In the coupler electrode, the upper flat part which can act as an electrode is supported by the support having the flexible portion which is elastically deformable in the height direction. Thus, it is possible to resist the external force applied in the height direction. As a result, the height of the composite communication apparatus can be lowered.

Furthermore, according to the embodiment of the present embodiment, Composite communication apparatus which can bear external force added to a height direction can be manufactured by the minimum additional cost.

According to the embodiment of the present invention, the coupler electrode of the second wireless processing section is arranged in the inside of the antenna coil of the first wireless processing section. The reading surfaces for the respective communication modes can be located at almost the same position. Thus, a series of processes can be performed by a user's single operation. In addition, high-capacity data transmission processing can be completed so that the user will feel the same sense of access time as that of the typical authentication/payment transaction.

According to the embodiment of the present invention, the coupler electrode of the second wireless processing section is arranged in an opening formed in the inside of the antenna coil of the first wireless processing section. As a result, the height of the composite communication apparatus can be lowered by exposing the upper flat part of the coupler electrode through the opening.

Further features of the invention, its nature and various advantages will be more apparent from the accompanying drawings and the following detailed description.

BRIEF DESCRIPTION OF THE DRAWINGS

FIG. 11A is a diagram illustrating an example of a method of manufacturing a coupler electrode of a high-frequency coupler, where the part of the coupler electrode processed by plate processing is represented (after punching);

FIG. 11B is a diagram illustrating an example of a method of manufacturing a coupler electrode of a high-frequency coupler, where the part of the coupler electrode processed by plate processing is represented (after bending);

FIG. 11C is a side view of an example of a coupler electrode manufactured by plate processing;

FIG. 11D is a perspective view of the example of the coupler electrode manufactured by plate processing;

FIG. 11E is another side view of the example of the coupler electrode manufactured by plate processing;

DESCRIPTION OF THE PREFERRED EMBODIMENTS

Hereafter, embodiments of the present invention will be described in detail with reference to the attached drawings.

As described above, the maximum communication rate of the NFC may be up to 424 kbs, which is extremely lower than that of any of other general-purpose wireless communications. Therefore, the actual use of the NFC has been restricted to small-capacity data transmission, such as data of electronic money and personal identification.

On the other hand, any of the embodiments of the present invention is provided for a complex communication system. The system includes a first wireless processing section and a second wireless processing section. The first wireless processing section is mainly used for authentication and payment transaction based on the NFC. In contrast, the second wireless processing section is responsible for an increase in communication rate of the entire system by carrying out high-speed communication even though it performs data communication at short range in much the same way as that of the first wireless processing section. Furthermore, the first wireless processing section is compatible with the typical wireless communication based on the common NFC standards, substantially. Therefore, the system is able to perform the typical wireless communication based on the NFC when it does not perform communication using the second wireless processing section.

The NFC technology applied to the above first wireless processing section may be the typical electromagnetic induction type contactless communication system, and thus the detailed description thereof is omitted herein.

On the other hand, an exemplary short-range high-speed wireless communication technologies applicable to high-speed communication using the above second wireless processing section may be a weak UWB communication system with a low band frequency of 4-GHz in UWB ("Transfer Jet") (see, for example, Japanese Patent Laying-Open No. 2008-99236 or www.transferjet.org/en/index.html). Here, the principle operation of the short-range high-speed wireless communication with weak UWB communication technology will be described.

Figure 3:
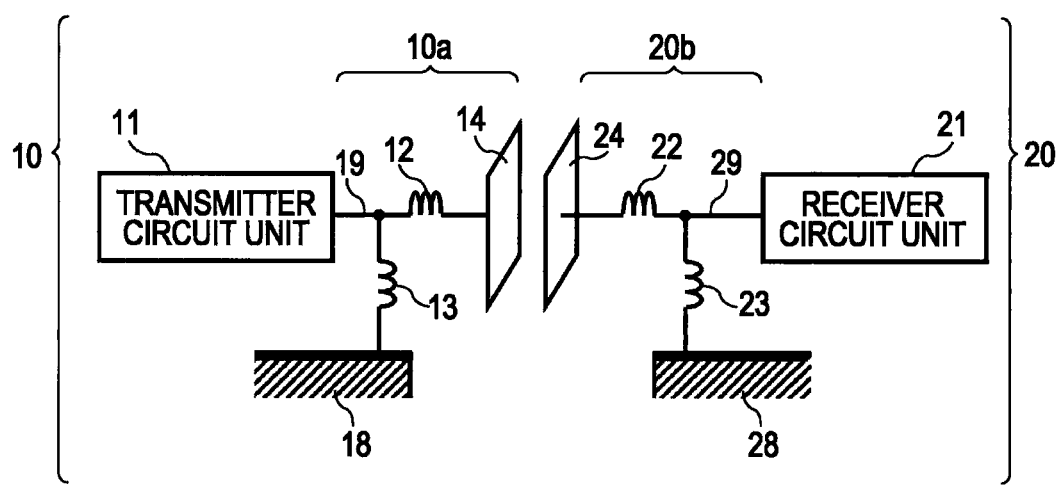
FIG. 3 is a diagram schematically illustrating the configuration of a short-range high-speed-wireless-communications system with a weak UWB communication mode.

FIG. 3 is a schematic configuration of a short-range high-speed wireless communication system using a weak UWB communication mode. In this figure, the communication system includes a transmitter 10 and a receiver 20. A coupler electrode 14 of the transmitter 10 and a coupler electrode 24 of the receiver 20 are used for transmitting/receiving information. These coupler electrodes 14 and 24 face to each other and are placed at a predetermined distance, for example approximately 3 cm from each other, enabling electric-field coupling. When a transmitter circuit unit 11 of the transmitter 10 receives a transmission request from a higher-order application, the transmitter circuit unit 11 generates a high-frequency transmission signal, such as a UWB signal, based on transmission data, followed by transmitting the signal from the transmitter electrode 14 to the receiver electrode 24. Subsequently, the receiver circuit unit 21 of the receiver 20 demodulates and decodes the received high-frequency signal, followed by passing the reproduced data to the higher-order application.

A communication mode using a high frequency and a broadband, such as a UWB communication, can realize an ultra high-speed data transmission of approximately 100 Mbps at short range. In addition, as described later, if the UWB communication is performed using the coupling action of an electrostatic field or induction field but a radiation field, the field intensity thereof is in inverse proportion to the cube or square of distance. Thus, by suppressing the field intensity at a distance of 3 m from a wireless communication facility, a weak wireless communication can be allowed without the licensing of wireless stations and a communication system can be inexpensively established. In addition, if a data communication is performed at short range using an electric-field-coupling mode, there are advantages of preventing the quality of signals from being lowered in the presence of reflecting objects around the wireless communication system, considering neither of the prevention of hacking or the security of concealment, and so on.

On the other hand, a propagation loss increases in proportion to a propagation distance per signal wavelength. Thus, the propagation loss should be sufficiently lowered when a high-frequency signal is transmitted by electric field coupling. In a communication system for transmitting a high-frequency broad band signal, such as a UWB signal, even a communication at a short range of approximately 3 cm is not disregarded because of corresponding to one half of a used frequency band of 4 GHz. Compared with a low frequency circuit, especially a matter of characteristic impedance is more serious for a high frequency circuit, leading to an increased influence of impedance mismatch at a coupling point between the electrode of the transmitter and the electrode of the receiver.

A communication using a frequency of kHz or MHz band is of a small propagation loss in space, so that it can perform a desired data transmission even when the couplers of a transmitter and a receiver include are only constructed of electrodes and the coupling portions thereof simply act as a parallel plate capacitor. In contrast, a communication using a high frequency of GHz band leads to a large propagation loss in space, so that signal reflection should be suppressed to improve the transmission efficiency of the communication.

Even if a transmission path of high frequency signals in each of a transmitter and a receiver is adjusted to the predetermined characteristic impedance, impedance matching at the coupling portion will not be attained by only coupling with a parallel plate capacitor. For instance, in the communication system illustrated in FIG. 3, when the coupling portion between the transmitter electrode 14 and the receiver electrode 24 has impedance mismatching even if a high-frequency signal transmission path connecting between a transmitter circuit 11 and a transmitter electrode 14 is a coaxial track with an impedance matching of 50 ohms, propagation loss can be occurred by signal inversion and a decrease in communication efficiency occurs.

Figure 4:
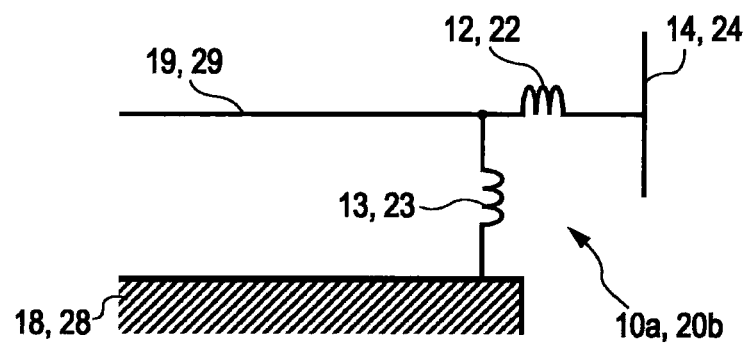
FIG. 4 is a diagram schematically illustrating the principle configuration of a high-frequency coupler arranged in each of a transmitter and a receiver.

In the present embodiment, as shown in FIG. 4, the transmitter 10 includes a high frequency coupler 10a constructed by connecting a resonance part constructed of a plate-like electrode 14, a series inductor 12, and a parallel inductor 13 to a high-frequency signal transmission path 19. In addition, the receiver 20 includes a high frequency coupler 20b constructed by connecting a resonance part constructed of a plate-like electrode 24, a series inductor 22, and a parallel inductor 23 to a high-frequency signal transmission path 29. If these high-frequency couplers are arranged facing to each other, the coupling portion can act as a band-pass filter to efficiently transmit a high-frequency signal between two high-frequency couplers. The term "high-frequency signal transmission path" used herein may represent one constructed of a coaxial cable, a micro-stripe line, a coplanar line, or the like.

Here, in a portion between the electrode of the transmitter 10 and the electrode of the receiver 20, or a coupling portion thereof, if it is only desired to take impedance matching to prevent the generation of a reflected wave, even when each of couplers has a simple structure in which a flat-plate electrode 14, 24 and a serious inductor are seriously inserted in a high-frequency signal transmission path, it is possible to design the coupling portion to be provided with continuous impedance. However, there is no change in characteristic impedance around the coupling portion, so that the degree of current can be unchanged. In contrast, the communication system is provided with parallel inductors 13, 23, so that a strong coupling can be induced on the coupler electrode 14 to make a strong coupling between the electrodes 14 and 24. In addition, when a large electric field is induced near the surface of the coupler electrode 14, the generated electric field is propagated as a longitudinal wave oscillating in the traveling direction (the direction of a micro dipole; described later) from the surface of the coupler electrode 14. The wave of the electric field allows a signal to be propagated even when the distance between the coupler electrodes 14 and 24 is comparatively large.

Therefore, the indispensable prerequisites of the short-range wireless communication system with a weak UWB communication mode as a high-frequency coupler are as follows:

(1) It is a coupler electrode for coupling in an electric field;
(2) It is a parallel inductor for making a coupling in a stronger electric field; and
(3) The constant values of the impedance due to the series/parallel inductors and the coupler electrodes can be defined so that impedance matching can be attained when the couplers are arranged facing to each other at a frequency band commonly used in communications.

In the communication system shown in FIG. 3, when the coupler electrode 14 of the transmitter 10 and the coupler electrode 24 of the receiver 20 are arranged facing to each other at a suitable distance, a combination of two high-frequency couplers 10a and 20b may act as a band-pass filter that passes a signal with a desired wavelength band therethrough and each high-frequency coupler 10a, 20b independently acts as an impedance-conversion circuit that amplifies an electric current. On the other hand, if the high-frequency coupler 10a, 20b is independently placed in free space, an input impedance of the high-frequency coupler 10a, 20b does not match the characteristic impedance of the high-frequency signal transmission path 19, 29. The signal entered from the high-frequency signal transmission path 19, 29 is reflected in the high-frequency coupler 10a, 20b and emitted outside. Thus, the neighboring other communication systems are not affected. In other words, the transmitter 10 generates no output like an electric wave from an antenna when there is no partner to be communicated. The transmitter 10 performs the transmission of a high-frequency signal when the both terminals to be communicated to each other are brought into close proximity and their respective electrodes form capacitors to establish an impedance matching.

Figure 5:
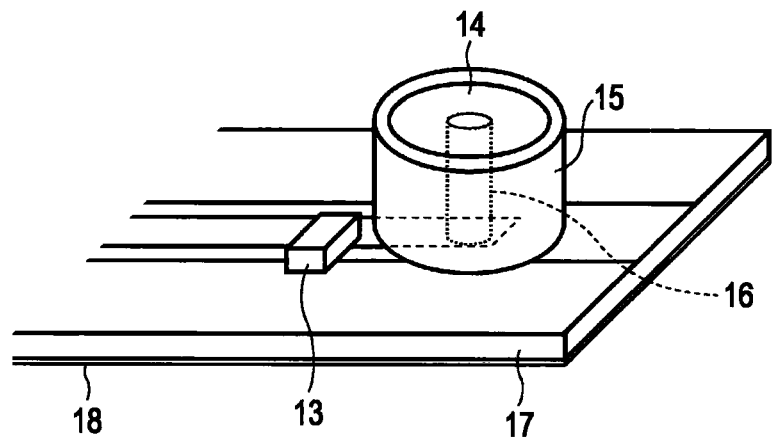
FIG. 5 is a diagram illustrating an implementation example of the high-frequency coupler shown in FIG. 4.

FIG. 5 is a diagram illustrating an implementation example of the high-frequency coupler shown in FIG. 4. The high-frequency coupler of the transmitter 10 and the high-frequency coupler of the receiver 20 can be constructed similarly. In this figure, the coupler electrode 14 is arranged on the top surface of a cylindrical dielectric body 15. The coupler electrode 14 is electrically connected to the high-frequency signal transmission path on a printed circuit board 17 via a through hole 16 passing through the dielectric body 15.

The high-frequency coupler shown in the figure can be manufactured by forming the through hole 16 in the cylindrical dielectric body with a desired height, forming a conductor pattern to be provided as a coupler electrode 14 on the top end surface of the cylinder, filling up the through hole 16 with a conductor, and implementing the dielectric body 15 on the printed circuit board 17 by a reflow process or the like. Here, the height of the coupler electrode 14 from the circuit-implemented surface of the printed circuit board 17 (i.e., the length of the through hole 16) is suitably adjusted depending on the used wavelength. Therefore, the through hole 16 has an inductance and may be substituted with the series inductor 12 shown in FIG. 4. In addition, the high-frequency signal transmission path can be connected to ground 18 via a chip-like parallel inductor 13.

Here, an electromagnetic field generated at the coupler electrode of the transmitter 10 will now be considered.

Figure 1:
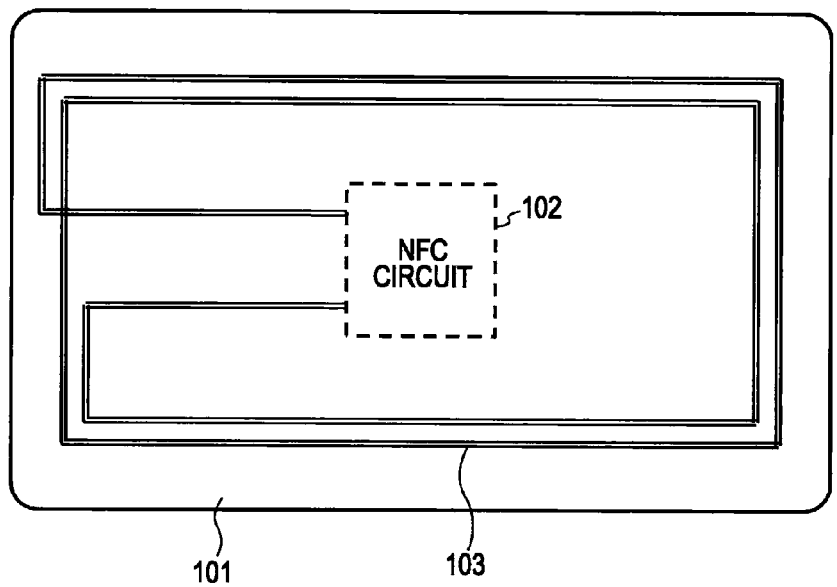
FIG. 1 is a top view of a modularized reader/writer.
Figure 2:
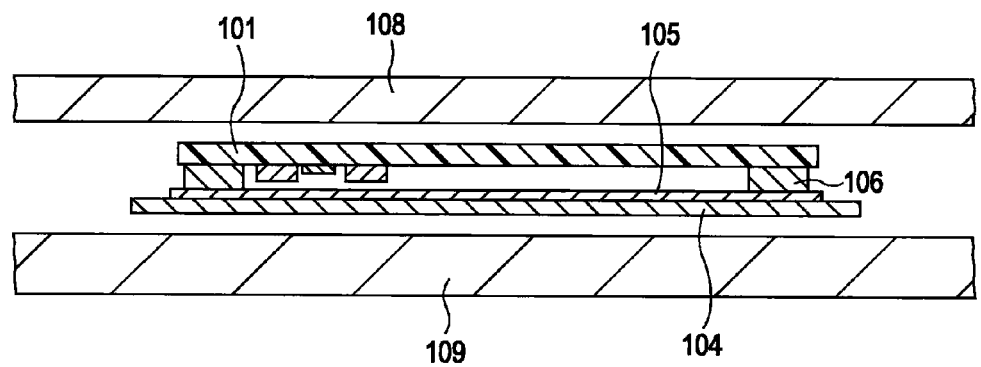
FIG. 2 is a schematic diagram illustrating the cross-sectional configuration of an apparatus, such as a personal computer, in which the read/writer module shown in FIG. 1 is installed.

As shown in FIG. 1 and FIG. 2, the coupler electrode 14 is connected to one end of the high-frequency signal transmission path and receives the flow of output signals from the transmitter circuit unit 11 to store electric charges. At this time, the current flowing into the coupler electrode 14 can be amplified by a resonance section constructed of the series inductor 12 and the parallel inductor 13.

Furthermore, the ground 18 is arranged so that it can face to the coupler electrode 14 at a predetermined distance from each other enough to avoid an influence of the wavelength of a high-frequency signal. Furthermore, the accumulation of electric charges in the coupler electrode 14 as described leads to the accumulation of mirror charges in the ground 18. Needless to say, if a point charge Q is placed on the outside of a flat conductor, a mirror charge −Q, which is a virtual one with a replaced surface-charge distribution, is placed in the flat conductor as described in, for example, Tadashi Mizokuchi: "Electromagnetics" pp. 54-57, published by Shokabo Publishing Co., Ltd., (see, the attached FIGS. 1 to 3 of this publication).

As a result, a micro dipole consisting of a line segment that connects the center of the electric charge accumulated in the coupler electrode 14 and the center of the mirror charge accumulated in the ground 18 is formed. Specifically, the electric charge Q has the same volume as that of the mirror charge −Q and the micro dipole is formed to make a connection between the center of the electric charge to the center of the mirror electric charge. The term "micro dipole" used herein means an electric dipole with a very short distance between electric charges. The description of "micro dipole" can be also found in Yasuto Mushiake: "Antenna/Radio Wave Propagation" pp. 16-18, published by CORONA publishing Co., Ltd. Then, the presence of the micro dipole leads to the generation of the (transverse wave component Eθ and the longitudinal wave component $E_R$ of the electric field as well as the magnetic field $H_\phi$ around the micro dipole.

Figure 6:
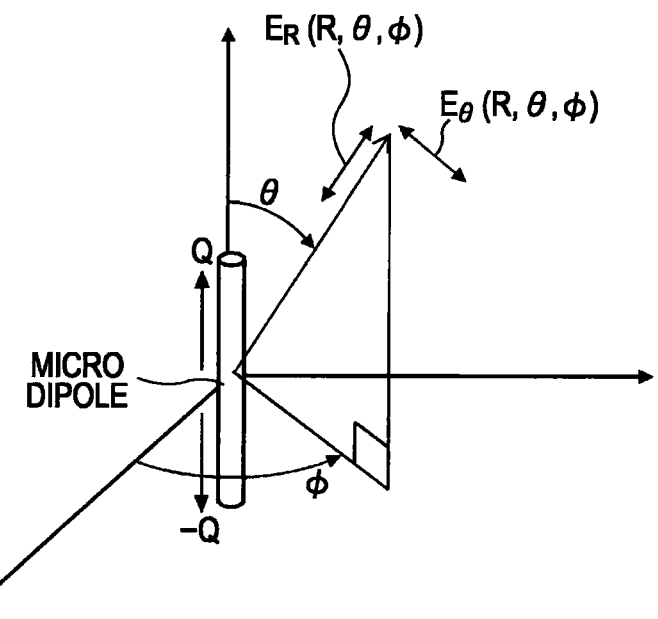
FIG. 6 is a diagram illustrating an electromagnetic field generated by a micro dipole.
Figure 7:
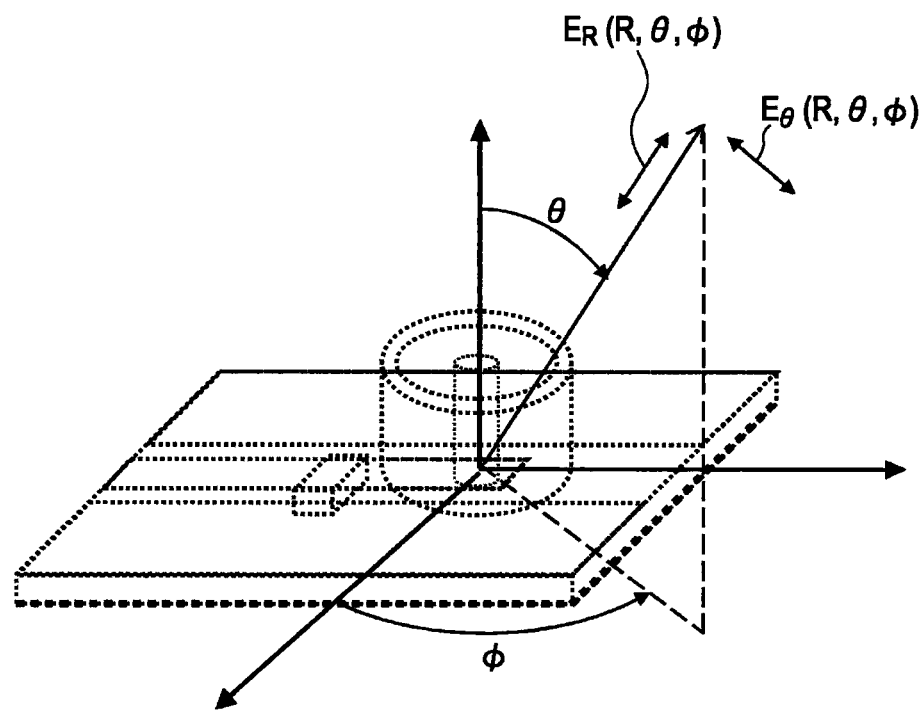
FIG. 7 is a diagram illustrating that the electromagnetic field shown in FIG. 6 is mapped on a coupler electrode.

FIG. 6 represents an electromagnetic field caused by the micro dipole. In FIG. 7, the electromagnetic field is mapped on the coupler electrode. As shown in the figure, the transverse direction Eθ of the electric field vibrates in the direction perpendicular to the propagation direction and the longitudinal wave component $E_R$ of the electric field vibrates in the direction parallel to the propagation direction. In addition, magnetic field $H_\phi$ occurs around the minute dipole. The following expressions (1) to (3) represent an electromagnetic field generated by the micro dipole. In the following expressions (1) to (3), a component in inverse proportion to the third power of distance R represents an electrostatic field, a component in inverse proportion to the second power of distance R represents an induction electric field, and a component in inverse proportion to distance R represents a radiation field.

$$E_\theta = \frac{pe^{-jkR}}{4\pi\varepsilon}\left(\frac{1}{R^3} + \frac{jk}{R^2} - \frac{k^2}{R}\right)\sin\theta \tag{1}$$

$$E_R = \frac{pe^{-jkR}}{2\pi\varepsilon}\left(\frac{1}{R^3} + \frac{jk}{R^2}\right)\cos\theta \tag{2}$$

$$H_\phi = \frac{j\omega pe^{-jkR}}{4\pi}\left(\frac{1}{R^2} + \frac{jk}{R}\right)\sin\theta \tag{3}$$

In the short-range wireless communication system illustrated in FIG. 3, to prevent the generation of disturbing waves to another neighboring system, it is considered that the longitudinal wave $E_R$, which is free of a radiation field component, is preferably used while the transverse wave Eθ with a radiation field component is prevented. This is because, as is evident from the above expressions (1) and (2), the transverse wave component Eθ of the electric field includes a radiation filed in inverse proportion to the distance (i.e., attenuation in distance is small), while the longitudinal wave component $E_R$ does not contain a radiation field.

Figure 8:
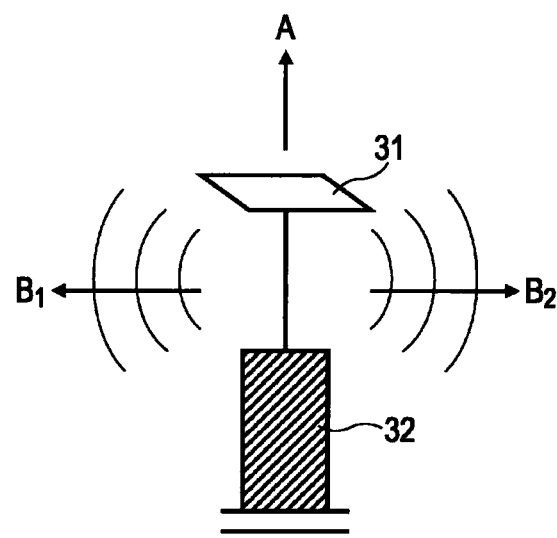
FIG. 8 is a schematic diagram illustrating an exemplary configuration of a capacitor-loading type antenna.
Figure 9A:
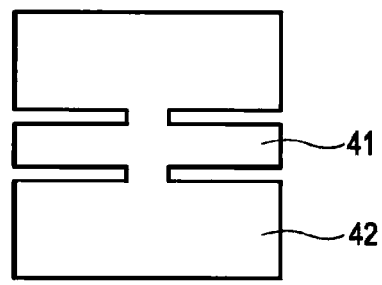
FIG. 9A is a diagram illustrating an example of a method of manufacturing a coupler electrode of a high-frequency coupler, where the part of the coupler electrode processed by plate processing is represented (after punching)
Figure 9B:
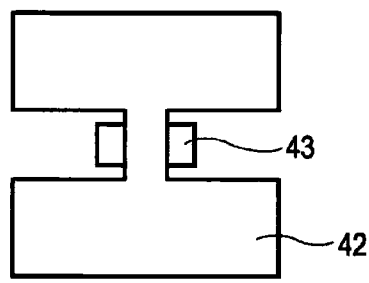
FIG. 9B is a diagram illustrating an example of a method of manufacturing a coupler electrode of a high-frequency coupler, where the part of the coupler electrode processed by plate processing is represented (after bending)
Figure 9C:
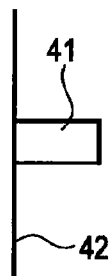
FIG. 9C is a side view of an example of a coupler electrode manufactured by plate processing.
Figure 9D:
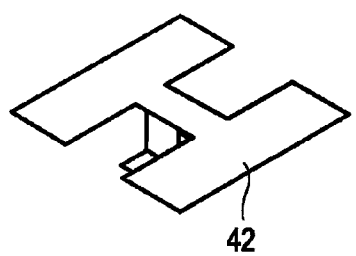
FIG. 9D is a perspective view of the example of the coupler electrode manufactured by plate processing.
Figure 9E:
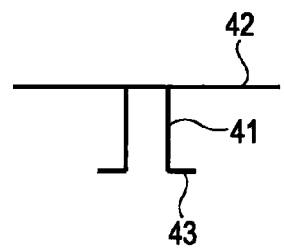
FIG. 9E is another side view of the example of the coupler electrode manufactured by plate processing.
Figure 10A:
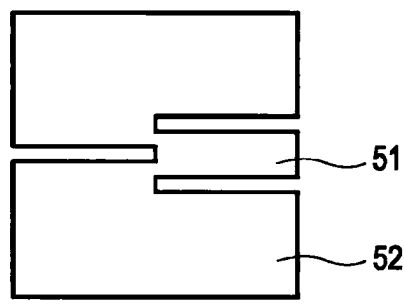
FIG. 10A is a diagram illustrating an example of a method of manufacturing a coupler electrode of a high-frequency coupler, where the part of the coupler electrode processed by plate processing is represented (after punching)
Figure 10B:
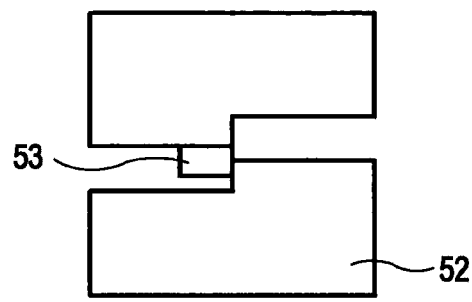
FIG. 10B is a diagram illustrating an example of a method of manufacturing a coupler electrode of a high-frequency coupler, where the part of the coupler electrode processed by plate processing is represented (after bending)
Figure 10C:
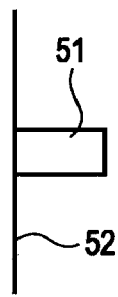
FIG. 10C is a side view of an example of a coupler electrode manufactured by plate processing.
Figure 10D:
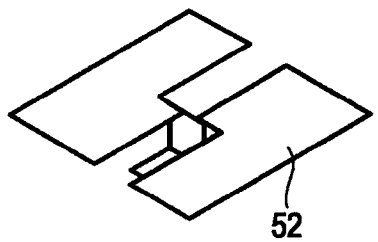
FIG. 10D is a perspective view of the example of the coupler electrode manufactured by plate processing.
Figure 10E:
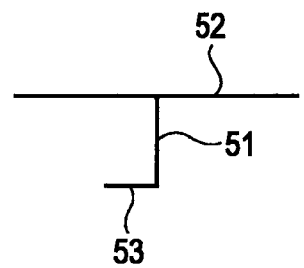
FIG. 10E is another side view of the example of the coupler electrode manufactured by plate processing.

First, in order to prevent the generation of the transverse wave component Eθ of the electric field, it is desired to prevent the high-frequency coupler from acting as an antenna. The configuration of the high-frequency coupler shown in FIG. 4 may be similar to that of a "capacitor-loading type" antenna at the first glance. Here, the capacitor-loading type antenna includes a metallic part on the tip end of the antenna element to provide the antenna with electrostatic capacity to shorten the height of the antenna. Therefore, it is desired to prevent the high-frequency coupler from acting as a capacitor-loading type antenna. FIG. 8 illustrates an exemplary configuration of the capacitor-loading type antenna that includes an antenna element 31 and a coaxial cable 32. In this figure, the longitudinal wave component $E_R$ is mainly generated from an antenna element 31 in the direction of arrow A, while the transverse component Eθ is generated in the directions of arrows B1 and B2.

In an exemplary configuration of the coupler electrode shown in FIG. 5 includes a dielectric body 15 and a through hole 16, which are responsible for avoiding the coupler electrode 14 from connecting the coupler electrode 14 to the ground 18 and for the formation of the series inductor 12. The series inductor 12 is designed by attaining a sufficient height from the circuit-mounted surface of the printed circuit board 17 to the electrode 14 to avoid an electric-field coupling between the ground 18 and the electrode 14, thereby ensuring an electric-field coupling with the high-frequency coupler of the receiver. However, if the height of the dielectric body 15 is too high, or the distance from the circuit-mounted surface of the printed circuit board 17 to the electrode 14 has a considerable length with respect to the used wavelength, the high-frequency coupler may be operated as a capacitor-loading type antenna. Thus, the component Eθ can be generated as described by the arrows B1 and B2 in FIG. 8. Therefore, the height of the dielectric body 15 is enough to obtain characteristics as a high-frequency coupler by avoiding the coupling between the electrode 14 and the ground 18. In addition, the height of the dielectric body 15 is also enough to construct the series inductor 12 to be used for preparing an impedance matching circuit, while the height of the dielectric body 15 is desired to be short enough to prevent an increase in radiation of undesired current Eθ.

On the other hand, from the expression (2), it turns out that the longitudinal wave $E_R$ component becomes the maximum at an angle θ of zero (0) with respect to the direction of the micro dipole. Therefore, in order to perform a contactless communication efficiently using the longitudinal wave $E_R$ of the electric field, it is preferable to perform the transmission of high-frequency signals by oppositely arranging the high-frequency couple of the receiver at an angle θ of substantially zero with respect to the direction of the micro dipole.

In addition, it is possible to enlarge the current of high-frequency signals flowing into the coupler electrode 14 by the resonance part constructed of the series inductor 12 and the parallel inductor 13. As a result, the moment of the micro dipole formed by the electric charges accumulated in the coupler electrode 14 and the mirror charges accumulated in the ground 18 can be enlarged. The high-frequency signals including the longitudinal wave $E_R$ of the electric field can be efficiently discharged in the propagation direction which is at an angle θ of substantially zero with the direction of the micro dipole.

Referring again to FIG. 5, there is illustrated the exemplary configuration of a high-frequency coupler on which the short-range wireless communication system shown in FIG. 3 can be applied. However, the embodiment of the present invention is not limited to such a configuration of the high-frequency coupler. Alternatively, for example, portion of the coupler electrode 14 of the high-frequency coupler may be simply formed by sheet metal processing in a cost effective manner. FIG. 9 to FIG. 11 are provided for illustrating the process of manufacturing the coupler electrode.

In each of these figures, a sheet metal made of copper or the like is subjected to punching processing to form a leg part 41, 51, 61 and an upper flat part 42, 52, 62. Here, the upper flat part 42, 52, 62 has a comparatively larger surface area and functions as a coupler electrode 14 for accumulating electric charges. In addition, the leg part 41, 51, 61 can be functioned as a support for supporting the upper flat part 42, 52, 62 on the printed circuit board 17 and also functioned as a series inductor 12 as well as a propagation path of electric charges to the coupler electrode 14.

Subsequently, the leg part 41, 51, 61 is subjected to bending processing and bent into almost right angle with the upper flat part 42, 52, 62. Furthermore, the lower end portion of the leg part 41, 51, 61 is bent to form a flattened portion to be provided as a connection with a high-frequency signal line and used for adjusting the leg part 41, 51, 61 to a desired height. Here, the term "desired height" corresponds to a size which is responsible for avoiding a coupling between the coupler electrode 14 and the ground 18 while preventing the leg part 41, 51, 61 from being acted as a capacitor-loading type antenna and also responsible for the formation of the series inductor 12.

The coupler electrode thus formed (FIG. 9 to FIG. 11) may be fixed on a predetermined position on the printed circuit board 17 using a fixture (not shown) or the like and a flatted portion 43, 53 thereof as a connection is then attached to the wiring pattern on the printed circuit board 17 by a process such as reflow soldering.

Furthermore, the number of the leg parts, which can be acted as a series inductor 12, may be two as shown in FIG. 9 and FIG. 11, one as shown in FIG. 10, or three or more (not shown in the figure).

Next, a composite communication apparatus will be described in detail as another embodiment of the present invention. In the composite communication apparatus, a NFC communication mode is used as a first wireless processing section and a weak UWB communication mode is used as a second wireless processing section.

Both communication modes can be classified into short-range wireless communications technology. However, the NFC communication is a common technology for authentication/payment transaction and so on. On the other hand, the weak UWB communication mode is available for high-capacity data transmission. Therefore, in the contents transaction, such as the download of contents from an automatic vending machine to a portable terminal or the down load of contents from a charged site to a portable terminal through a personal computer connecting to the Internet, authentication/payment transaction may be performed using NFC communication, and a high-capacity data transmission may be formed using a weak UWB communication mode. According to the weak UWB communication mode, high-capacity data transmission processing will be completed, so that the user will feel the same sense of access time as that of the typical authentication/payment transaction.

In this case, the authentication/payment transaction using the NFC mode and the high-capacity data transmission using the weak UWB communication mode can be performed by only a single user's operation of placing the portable terminal over the reading surface of the reader/writer, enhancing the convenience for the user. Therefore, the read positions for the respective communication modes can be proximity to each other. In other words, an antenna coil used in NFC mode can be in proximity to the coupler electrode in weak UWB communication mode. In this case, regardless of the mode, the user is allowed to place the portable terminal over almost the same position every time, making the operation easier.

Figure 12:
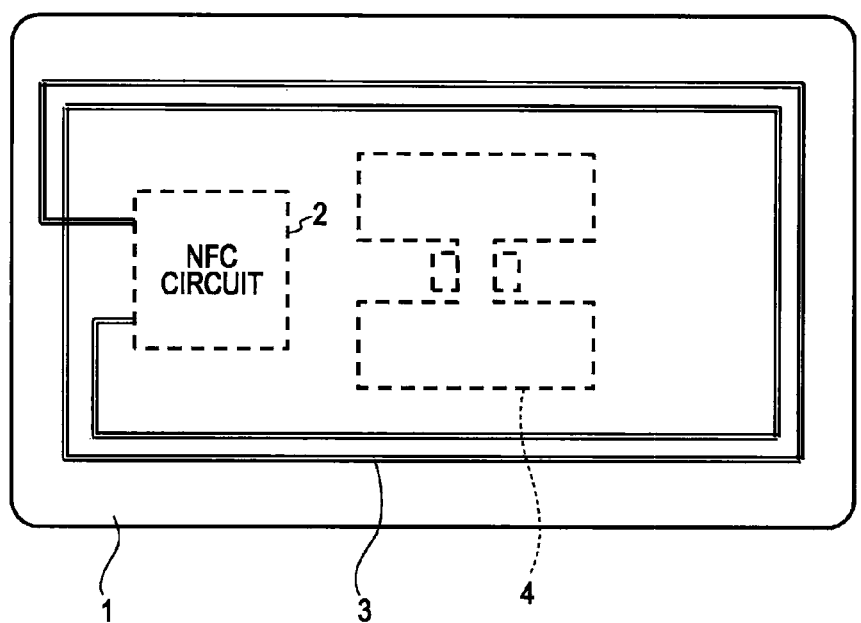
FIG. 12 is a top view of a reader/writer module in NFC mode, where the coupler electrode of the high-frequency coupler in weak UWB communication mode is arranged in the inside of the antenna coil of the reader/writer module.

The details of the reader/writer mode which can be implemented in any of various apparatuses have been described in the column "Description of the Related Art". As shown in FIG. 12, for example, a leader/writer module 1 includes a NFC communication circuit, an antenna coil 3, and a coupler electrode 4. In other words, in the inside of the antenna coil 3 of the reader/writer module 1 in NFC mode, the coupler electrode 4 of the high-frequency coupler in weak UWB communication mode may be arranged. Since the reading surfaces for the respective communication modes can be located at almost the same position. Thus, a series of processes can be performed by a user's single operation. However, in the example shown in FIG. 12, the coupler electrode is one prepared by sheet processing like the one shown in FIG. 9.

Here, if the antennas of the respective communication systems are arranged in one apparatus, the couplings of the respective antennas may occur and cause the interference between the antennas as a problem. In contrast, the composite communication apparatus according to the embodiment of the present invention may employ a communication in NFC mode as a first wireless processing section and a communication in weak UWB communication mode as a second wireless processing section. Thus, the first wireless processing section generates a magnetic field to carry out a contactless communication with magnetic field coupling. On the other hand, the second wireless processing section generates an electric field to carry out a contactless communication with electric field coupling.

As illustrated in FIG. 12, the coupler electrode 4 is arranged in the magnetic field generated by the antenna coil 3 of the reader/writer module 1. Thus, the magnetic field intersects the coupler electrode 4. The coupler electrode generates an electric field that can vibrate almost in parallel with the vibrating direction of the magnetic field at the intersection.

Fundamentally, a change in electric field causes a change in magnetic field and the vibrating direction of the magnetic field is then perpendicular to the vibrating direction of the electric field. In addition, the magnetic fields or electric fields having components with the same vibrating direction interfere with each other. Therefore, the electric field and the magnetic field, in which their vibrating directions are perpendicular to each other, also interfere with each other. These interference phenomena will affect electric field coupling or magnetic field coupling. On the other hand, the magnetic fields or the electric fields having their respective vibrating directions which are perpendicular to each other hardly interface with each other. Likewise, the electric field and the magnetic field, in which their respective vibrating directions are in parallel, also hardly interface with each other. In the exemplary configuration of the reader/writer mode 1 shown in FIG. 12, the vibrating direction of the magnetic field at a position of intersection between the magnetic field generated by the antenna coil as a first wireless processing section and a coupler electrode as a second inorganic processing section is in parallel with the vibrating direction of the electric field generated from the coupler electrode as a second wireless processing unit. Therefore, the interference between the magnetic field generated by the first wireless processing section and the electric field generated by the second wireless processing section can be hardly occurred.

Here, a method of avoiding the interference between the magnetic field generated by the first wireless processing section and the electric field generated by the second wireless processing section can be found in Japanese Patent Application JP 2007-292586 already transferred to the present applicant.

The reader/writer module 1 is built in the palm rest portion of a main-body keyboard installed in a notebook type computer (mentioned above). In such a case, a comparatively large reading surface can be obtained. In addition, the reader/writer module 1 is located at a noticeable place, the anterior edge of the main-body key board. However, at the time of original use of a computer, such as keyboard entry, housing may be bent by the palm of the user on the palm rest. Needless to say, when a reader/writer module is installed in an apparatus other than the computer, this module is placed near the surface of housing on account of a communication range. Therefore, the module may tend to be affected by distortion of the housing due to the application of external force.

Figure 13:
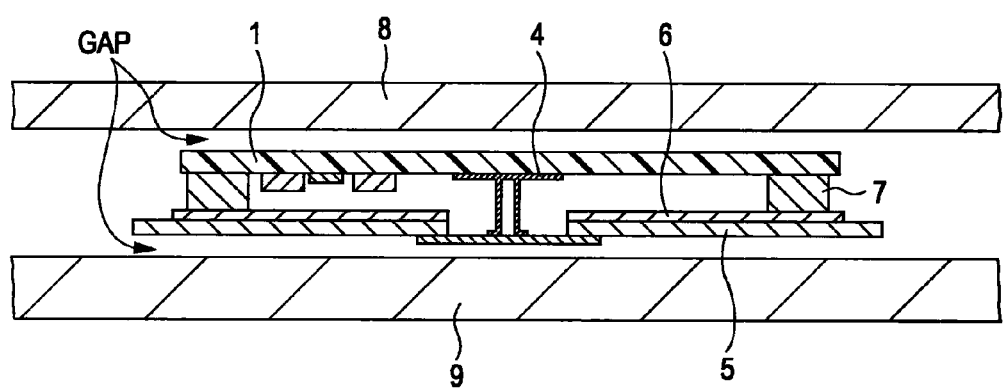
FIG. 13 is a cross-sectional view of the reader/writer module in NFC mode, where the coupler electrode of the high-frequency coupler in weak UWB communication mode is arranged in the inside of the antenna coil of the reader/writer module.

FIG. 13 is a cross-sectional diagram illustrating an implementation example (see FIG. 12) in which the coupler electrode 4 of the high-frequency coupler in weak UWB communication mode is arranged in the inside of the antenna coil 3 (see FIG. 12) of the reader/writer module 1 in NFC mode.

As shown in the figure, the reader/writer module 1 is supported on a metal plate 5 having a ferrite layer 6 via a spacer 7. In addition, the coupler electrode 4 manufactured by sheet processing is attached on a main board so that it is housed in the inside of the antenna coil 3 of the reader writer module 1. Furthermore, in each of the NFC mode and the weak UWB communication mode is provided for a short-range communication with a communication distance of approximately 0 to 10 cm. Thus, the reader/writer module 1 is installed near the top surface of housing 8 and the upper flat part of the coupler electrode 4 substantially abuts on the under surface of the board of the reader/writer module 1.

For example, if an external force is applied to the reading surface of the palm rest by placing the user's palm thereon, the pressure may be also applied to the board of the reader/writer module 1 and also applied to the coupler electrode 4 under the module 1. The module board is made of a raw material such as FR4 prepared by impregnating epoxy resin into a cloth woven from glass fibers or the like and has flexibility. Thus, it can restore to the original board shape when being released from the external force.

Figure 14A:
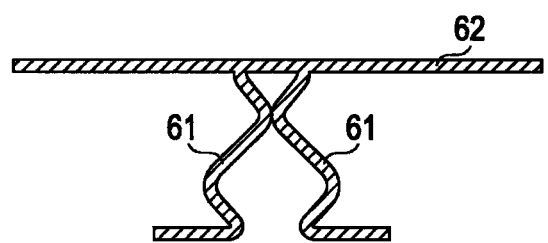
FIG. 14A is a diagram illustrating the leg part of the coupler electrode (FIG. 9) manufactured by plate processing, where the leg part is buckled by the external force applied in the height direction.
Figure 14B:
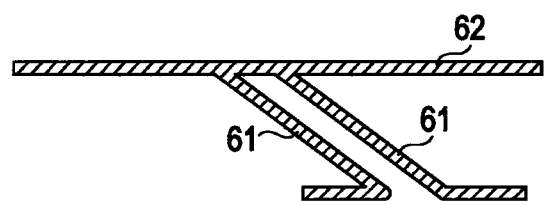
FIG. 14B is a diagram illustrating the leg part of the coupler electrode (FIG. 9) manufactured by plate processing, where the leg part is collapsed by the external force applied in the height direction.

On the other hand, in the case of the coupler electrode prepared by sheet plating, a support for supporting the upper flat part, which acts as an electrode, includes leg parts that straightly extend in the height direction. Thus, if the leg part receive the external force in the height direction, the leg part 61 may buckle (see FIG. 14A) or collapse (see FIG. 14B). The leg part 61 hardly restores to its original shape even if the external force is released therefrom. As described above, the height of the leg part is also responsible for avoiding the coupling between the coupler electrode and the ground. Therefore, if the upper flat part approaches the ground by buckling or collapse of the leg part 61, it does not act as a high-frequency coupler any longer. Among the complex communications, a weak UWB communication will be disabled.

By the way, there is a method to be considered to prevent the influence of the external force from reaching to the coupler electrode even if the external force is applied to and deforms the reading surface of the housing. The method is to enlarge a gap between the back of the housing and the board of the reader/writer module and to enlarge a gap between the metal plate and another built-in part below the metal plate. However, this method leads to an increase in height of the apparatus.

To prevent an increase in height of the apparatus, it is preferable to provide the leg part with a flexible portion 71 as a support of the coupler electrode. The flexible portion 71 can be elastically deformed in the height direction. Therefore, even if the external force is applied to the leg part from an upper flat part 72 in the height direction, only the flexible portion 71 is elastically deformed. Thus, when the external force is released from the leg part, the restoring force property of the flexible portion 71 allows the coupler electrode to be recovered to an original height.

Figure 15A:
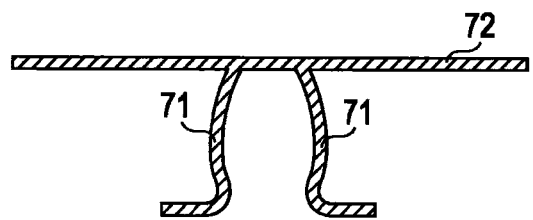
FIG. 15A is a diagram illustrating an exemplary configuration of a coupler electrode having a flexible portion which is elastically deformable in the height direction.

FIG. 15A illustrates an exemplary configuration of the coupler electrode in which the support has a flexible portion 71 which is elastically deformable in the height direction. As illustrated in the figure, the leg part as a support includes a curved flexible portion 71 almost at the center thereof in cross section. The flexible portion 71 acts as a plate spring against the external force applied in the height direction to release the external force from the leg part. Thus, the leg part can be restored to its original shape.

Figure 15B:
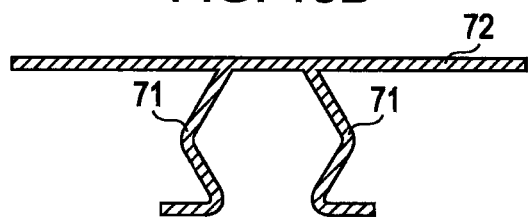
FIG. 15B is a diagram illustrating an exemplary configuration of a coupler electrode having a flexible portion which is elastically deformable in the height direction.

FIG. 15B illustrates another exemplary configuration of the coupler electrode in which the support has a flexible portion 71 which is elastically deformable in the height direction. As illustrated in the figure, the leg part as a support includes a flexible portion 71 of a generally "dogleg" shape in cross section. The flexible portion 71 acts as a plate spring against the external force applied in the height direction to release the external force from the leg part. Thus, the leg part can be restored to its original shape.

Figure 15C:
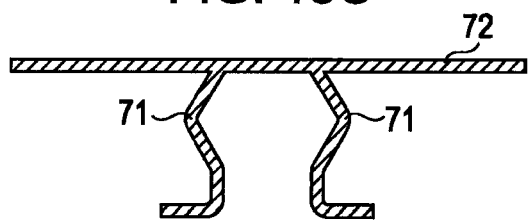
FIG. 15C is a diagram illustrating an exemplary configuration of a coupler electrode having a flexible portion which is elastically deformable in the height direction.

In another configuration example illustrated in FIG. 15C, the size of the "dogleg" shape in cross section, which influences the effects of the flexible portion 71 of the leg part, is designed to be smaller than one shown in FIG. 15B. The elastic coefficient and the amount of elastic deformation of the flexible portion 71 can be controlled by varying the size of the "dogleg" shape in cross section. The leg part 71 as a support is responsible for avoiding the coupling between the upper flat part 72 to be provided as a coupler electrode and the ground. However, even though the flexible portion can be restored, the performance of the high-frequency couple may be decreased when the amount of elastic deformation exceeds a predetermined level. According to the exemplary configuration shown in FIG. 15C, the amount of elastic deformation of the flexible portion can be decreased to certify a certain level or more of the performance of the high-frequency coupler.

Figure 15D:
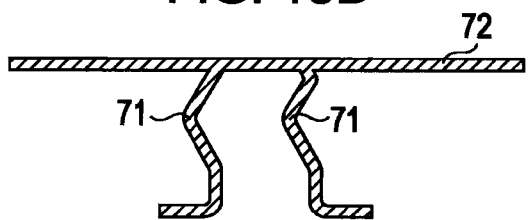
FIG. 15D is a diagram illustrating an exemplary configuration of a coupler electrode having a flexible portion which is elastically deformable in the height direction.

FIG. 15D illustrates another exemplary configuration of the coupler electrode in which the support has a flexible portion 71 which is elastically deformable in the height direction. As illustrated in the figure, each of two leg parts as a support includes a flexible portion 71 of a generally "dogleg" shape just as in the case of any of the exemplary configurations shown in FIG. 15B and FIG. 15C. In this example, however, the opened portion of the "dogleg" shapes of two leg parts do not face to each other but face in the same direction. Anyway, the flexible portion acts as a plate spring against the external force applied in the height direction to release the external force from the leg part. Thus, the leg part can be restored to its original shape.

According to the exemplary configurations of the coupler electrode shown in FIG. 15A to FIG. 15D, the flexible portion 71 acts as a plate spring against the external force applied in the height direction to release the external force from the leg part. Thus, the leg part can be restored to its original shape. Therefore, the height of the housing can be lowered by reducing the size of a gap between the back of the housing and the board of the reader/writer module and the size of a gap between the metal plate and another built-in part below the metal plate. In other words, the coupler electrode illustrated in any of the figures may be hardly destroyed.

In addition, to produce any of the coupler electrodes shown in FIG. 15A to FIG. 15D, the costs of materials are almost the same, and process costs can also be managed with the minimum addition.

Figure 16:
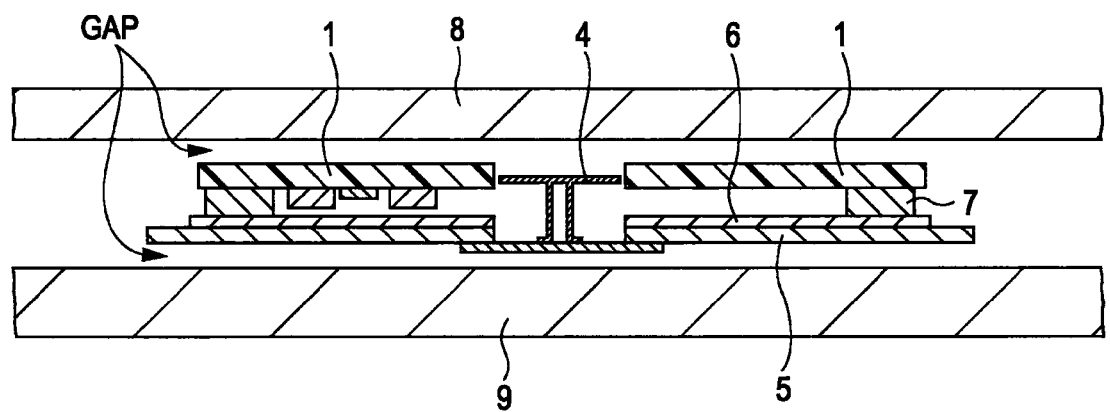
FIG. 16 is a diagram illustrating an exemplary configuration of a composite communication apparatus, where an opening is formed in a board of a reader/wrier module (almost in the center of an antenna coil) to expose the upper flat part of a coupler electrode, thereby lowering the height of the apparatus.

The leg part as a support is responsible for avoiding the coupling between the upper flat part to be provided as a coupler electrode and the grand. It is found that the upper flat part may be supported at a preferable height of approximately 3 mm from the ground. On the other hand, depending on a request of small height in housing design or the like, the height from the metal plate to be provided as a base to the reader/writer module may be restricted to 3.2 mm or less. In this case, as shown in FIG. 16, an opening is formed in the board of the reader/writer module 1 (i.e., formed in almost the center of the antenna coil) to exposure the upper flat part of the coupler electrode 4. Such a configuration of the device simultaneously satisfies the request of the height from the metal plate to the ground.

The present application contains subject matter related to that disclosed in Japanese Priority Patent Application JP 2009-059652 filed in the Japan Patent Office on Mar. 12, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device, comprising:
a communication circuit part that performs processing of a high-frequency signal for data transmission;
a transmission path of said high-frequency signal;
a ground;
a coupler electrode that includes an upper flat part that acts as an electrode, a support that supports said upper flat part so that said upper flat part faces said ground and is separately placed from said ground at a height only enough to ignore the wavelength of said high-frequency signal, while having a flexible portion which is elastically deformable in the direction of said height, and a connecting portion where the other end of said support is connected to said transmission path; and
a resonance part that enlarges a current flowing into said coupler electrode through said transmission path,
wherein a micro dipole formed of a line segment that connects the center of an electric charge accumulated in said upper flat part of said coupler electrode and the center of a mirror charge accumulated in said ground is formed, and
said high-frequency signal is transmitted to a communication partner oppositely arranged at an angle .theta. of substantially zero with respect to the direction of said mirco dipole.

2. The communication device according to claim 1, wherein said high frequency signal is a UWB signal using an ultra wideband.

3. The communication device according to claim 1, wherein said resonance part includes a series inductor connected between said coupler electrode and said transmission path and a parallel inductor connected between said transmission path and said ground, and said support serves as said series inductor.

4. The communication device according to claim 1, wherein said coupler electrode is manufactured by the steps of: subjecting a plate metal to punching processing to form said upper flat part and a leg part to be provided as said support; subjecting said leg part to bending processing to bend said leg part substantially perpendicular to said leg part and bend a lower end portion of said leg part to form a flattened portion; and curving or bending said leg part to form a flexible portion which is elastically deformable in the direction of said height.

5. A high-frequency coupler, comprising:
a transmission path of said high-frequency signal;
a ground;
a coupler electrode that includes an upper flat part that acts as an electrode, a support that supports said upper flat part so that said upper flat part faces said ground and is separately placed from said ground at a height only enough to ignore the wavelength of said high-frequency signal, while having a flexible portion which is elastically deformable in the direction of said height, and a connecting portion where the other end of said support is connected to said transmission path; and
a resonance part that enlarges a current flowing into said coupler electrode through said transmission path,
wherein a micro dipole formed of a line segment that connects the center of an electric charge accumulated in said upper flat part of said coupler electrode and the center of a mirror charge accumulated in said ground is formed, and
said high-frequency signal is transmitted to a high-frequency coupler of a communication partner oppositely arranged at an angle .theta. of substantially zero with respect to the direction of said micro dipole.

6. A coupler electrode used in a high-frequency coupler that performs transmission of a high-frequency signal using an electric field coupling action, said coupler electrode comprising:
an upper flat part that acts as an electrode;
a support that supports said upper flat part so that said upper flat part faces said ground and is separately placed from said ground at a height only enough to ignore the wavelength of said high-frequency signal, while having a flexible portion which is elastically deformable in the direction of said height; and
a connecting portion where the other end of said support is connected to said transmission path,
wherein said coupler electrode is manufactured by the steps of subjecting a plate metal to punching processing to form said upper flat part and a leg part to be provided as said support,
subjecting said leg part to bending processing to bend said leg part substantially perpendicular to said leg part and bend a lower end portion of said leg part to form a flattened portion, and
curving or bending said leg part to form a flexible portion which is elastically deformable in the direction of said height.

7. A composite communication apparatus, comprising:
means of first wireless processing that performs a contactless communication by an electromagnetic induction action using an antenna coil; and
means of second wireless processing that performs a contactless communication by an electric field coupling action using a coupler electrode arranged near said antenna coil,
wherein said means of second wireless processing includes
a communication circuit part that performs processing of a high-frequency signal for data transmission,
a transmission path of said high-frequency signal,
a ground,
a coupler electrode that includes an upper flat part that acts as an electrode, a support that supports said upper flat part so that said upper flat part faces said ground and is separately placed from said ground at a height only enough to ignore the wavelength of said high-frequency signal, while having a flexible portion which is elastically deformable in the direction of said height, and a connecting portion where the other end of said support is connected to said transmission path, and a resonance part that enlarges a current flowing into said coupler electrode through said transmission path,
  wherein a micro dipole is formed of a line segment that connects the center of an electric charge accumulated in said upper flat part of said coupler electrode and the center of a mirror charge accumulated in said ground is formed, and
  said high-frequency signal is transmitted to a communication partner oppositely arranged at an angle .theta. of substantially zero with respect to the direction of said micro dipole.

8. The composite communication apparatus according to claim 7, wherein said coupler electrode of said means of second wireless processing is manufactured by the steps of:
  subjecting a plate metal to punching processing to form said upper flat part and a leg part to be provided as said support;
  subjecting said leg part to bending processing to bend said leg part substantially perpendicular to said leg part and bend a lower end portion of said leg part to form a flattened portion; and
  curving or bending said leg part to form a flexible portion which is elastically deformable in the direction of said height.

9. The composite communication apparatus according to claim 7, wherein said coupler electrode of said means of second wireless processing is arranged in the inside of said antenna coil of said means of first wireless processing.

10. The composite communication apparatus according to claim 7, wherein said coupler electrode of said means of second wireless processing is arranged in an opening formed in the inside of said antenna coil of said means of first wireless processing.

11. A composite communication apparatus, comprising:
  a first wireless processing section that performs a contactless communication by an electromagnetic induction action using an antenna coil; and
  a second wireless processing section that performs a contactless communication by an electric field coupling action using a coupler electrode arranged near said antenna coil,
  wherein said second wireless processing section includes a communication circuit part that performs processing of a high-frequency signal for data transmission,
    a transmission path of said high-frequency signal,
    a ground,
    a coupler electrode that includes an upper flat part that acts as an electrode, a support that supports said upper flat part so that said upper flat part faces said ground and is separately placed from said ground at a height only enough to ignore the wavelength of said high-frequency signal, while having a flexible portion which is elastically deformable in the direction of said height, and a connecting portion where the other end of said support is connected to said transmission path, and
    a resonance part that enlarges a current flowing into said coupler electrode through said transmission path,
    wherein a micro dipole is formed of a line segment that connects the center of an electric charge accumulated in said upper flat part of said coupler electrode and the center of a mirror charge accumulated in said ground is formed, and
    said high-frequency signal is transmitted to a communication partner oppositely arranged at an angle .theta. of substantially zero with respect to the direction of said micro dipole.

* * * * *